(12) United States Patent
Amano

(10) Patent No.: US 10,466,578 B2
(45) Date of Patent: Nov. 5, 2019

(54) PROJECTION OPTICAL SYSTEM AND PROJECTION DISPLAY DEVICE

(71) Applicant: FUJIFILM Corporation, Tokyo (JP)

(72) Inventor: Masaru Amano, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/100,397

(22) Filed: Aug. 10, 2018

(65) Prior Publication Data

US 2019/0056647 A1 Feb. 21, 2019

(30) Foreign Application Priority Data

Aug. 17, 2017 (JP) ................................. 2017-157550

(51) Int. Cl.
G03B 21/28 (2006.01)
G03B 21/00 (2006.01)
G02B 13/18 (2006.01)
G03B 21/14 (2006.01)
G03B 21/10 (2006.01)
G02B 13/16 (2006.01)
G02B 17/08 (2006.01)
G02B 5/10 (2006.01)

(52) U.S. Cl.
CPC ............. *G03B 21/28* (2013.01); *G02B 13/16* (2013.01); *G02B 13/18* (2013.01); *G02B 17/08* (2013.01); *G03B 21/005* (2013.01); *G03B 21/10* (2013.01); *G03B 21/147* (2013.01); *G02B 5/10* (2013.01)

(58) Field of Classification Search
CPC .... G03B 21/005; G03B 21/006; G03B 21/10; G03B 21/28; G03B 21/142; G03B 21/2066; G02B 27/0955; G02B 27/0977; G02B 27/0983
See application file for complete search history.

(56) References Cited

U.S. PATENT DOCUMENTS

| 7,048,388 | B2 * | 5/2006 | Takaura | G02B 13/16 |
| | | | | 353/102 |
| 9,335,524 | B2 | 5/2016 | Chen et al. | |
| 2016/0299415 | A1 * | 10/2016 | Minefuji | G03B 21/53 |
| 2016/0370692 | A1 * | 12/2016 | Ode | G02B 27/0025 |

FOREIGN PATENT DOCUMENTS

| JP | 5484098 B2 | 5/2014 |
| JP | 2017-010023 A | 1/2017 |
| JP | 2017-032925 A | 2/2017 |
| JP | 2017-032927 A | 2/2017 |

* cited by examiner

*Primary Examiner* — Sultan Chowdhury
(74) *Attorney, Agent, or Firm* — Studebaker & Brackett PC

(57) ABSTRACT

A projection optical system consists of, in order from the magnification side, a first optical system, which consists of one convex mirror and a plurality of lenses disposed on the reduction side of the convex mirror, and a second optical system. The lens closest to the magnification side in the first optical system is a negative lens. Assuming that a paraxial radius of curvature of the convex mirror is Mr and a focal length of the negative lens closest to the magnification side in the first optical system is fL1, Conditional Expression is satisfied:

$0 < Mr/fL1 < 4.5$.

15 Claims, 10 Drawing Sheets

EXAMPLE 1

EXAMPLE 1

EXAMPLE 2

EXAMPLE 3

EXAMPLE 4

EXAMPLE 1

EXAMPLE 2

EXAMPLE 4

PROJECTION OPTICAL SYSTEM AND PROJECTION DISPLAY DEVICE

CROSS-REFERENCE TO RELATED APPLICATIONS

The present application claims priority under 35 U.S.C. § 119 to Japanese Patent Application No. 2017-157550, filed on Aug. 17, 2017. The above application is hereby expressly incorporated by reference, in its entirety, into the present application.

BACKGROUND OF THE INVENTION

1. Field of the Invention

The present invention relates to a projection optical system and a projection display device comprising the projection optical system.

2. Description of the Related Art

In the past, projection display devices, each of which projects an image displayed on a light valve such as a liquid crystal display element or a Digital Micromirror Device (DMD: registered trademark) onto a screen or the like in an enlarged manner, have come into widespread use. In a projection optical system used in combination with a light valve in a projection display device, it has been demanded that aberration correction appropriate for the resolution of the light valve is satisfactorily performed in response to recent improvement in performance of the light valve.

Examples of the projection optical system applicable to known projection display devices include optical systems described in JP2017-10023A, JP2017-32925A, JP2017-32927A, U.S. Pat. No. 9,335,524B, and JP5484098B. JP2017-10023A, JP2017-32925A, JP2017-32927A, U.S. Pat. No. 9,335,524B, and JP5484098B disclose an optical system that is composed of combination of a reflective optical system consisting of a mirror disposed to be closest to the magnification side and a refractive optical system including a plurality of lenses so as to form an intermediate image in the refractive optical system.

SUMMARY OF THE INVENTION

There is a demand for the projection optical system mounted on the projection display device to have a higher performance while having a compact configuration in consideration of improvement in degree of freedom in setting the distance to the screen and the installability in the indoor space and to have a wide angle.

However, in each optical system described in JP2017-10023A, JP2017-32925A, JP2017-32927A, and U.S. Pat. No. 9,335,524B, not only the mirror is large, but also correction of off-axis aberrations such as distortion and field curvature is not enough for the recent demand. In the optical system described in JP5484098B, not only the mirror is large, but also wide angle formation and satisfactory aberration are not achieved at the same time.

The present invention has an object to provide a projection optical system that is composed of combination of a reflective optical system and a refractive optical system so as to form an intermediate image and that has high optical performance by achieving a wide angle and satisfactorily correcting various aberrations without enlarging the reflective optical system, and a projection display device comprising the projection optical system.

In order to achieve the above-mentioned object, a projection optical system of the present invention consists of, in order from a magnification side to a reduction side: a first optical system that consists of one convex mirror and a plurality of lenses disposed on the reduction side of the convex mirror; and a second optical system that includes a plurality of lenses. The second optical system forms an intermediate image at a position conjugate to a reduction side imaging surface, and the first optical system forms a final image, which is conjugate to the intermediate image, on a magnification side imaging surface. A lens closest to the magnification side in the first optical system is a negative lens. In addition, assuming that a paraxial radius of curvature of the convex mirror is Mr and a focal length of the negative lens closest to the magnification side in the first optical system is fL1, Conditional Expression (1) is satisfied.

$$0 < Mr/fL1 < 4.5 \tag{1}$$

In the projection optical system of the present invention, it is preferable to satisfy the Conditional Expression (1-1).

$$0.5 < Mr/fL1 < 4 \tag{1-1}$$

In the projection optical system of the present invention, assuming that a composite focal length of all lenses positioned to be closer to the reduction side than the convex mirror is fR and a focal length of the projection optical system is f, it is preferable to satisfy the Conditional Expression (2), and it is more preferable to satisfy the Conditional Expression (2-1).

$$1.5 < |fR/f| < 3.5 \tag{2}$$

$$1.6 < |fR/f| < 2.6 \tag{2-1}$$

In the projection optical system of the present invention, assuming that a focal length of the first optical system is f1 and a focal length of the second optical system is f2, it is preferable to satisfy the Conditional Expression (3), and it is more preferable to satisfy the Conditional Expression (3-1).

$$0.03 < f1/f2 < 0.25 \tag{3}$$

$$0.05 < f1/f2 < 0.22 \tag{3-1}$$

In the projection optical system of the present invention, it is preferable that a second lens from the magnification side in the first optical system is a negative lens.

In the projection optical system of the present invention, assuming that a focal length of an air lens formed of a reduction side lens surface of the lens closest to the magnification side in the first optical system and a magnification side lens surface of the second lens from the magnification side in the first optical system is fA and a focal length of the projection optical system is f, it is preferable to satisfy the Conditional Expression (4), and it is more preferable to satisfy the Conditional Expression (4-1).

$$-8 < fA/|f| < -2 \tag{4}$$

$$-7 < fA/|f| < -2.4 \tag{4-1}$$

In the projection optical system of the present invention, assuming that an Abbe number of the second lens from the magnification side in the first optical system at the d line is vd2, it is preferable to satisfy the Conditional Expression (5), and it is more preferable to satisfy the Conditional Expression (5-1).

$$10 < vd2 < 40 \tag{5}$$

$$15 < vd2 < 35 \tag{5-1}$$

In the projection optical system of the present invention, assuming that the first optical system and the second optical system have a common optical axis, an air gap on the optical axis between the first optical system and the second optical system is DG12, and an air gap on the optical axis between the convex mirror and the lens closest to the magnification side in the first optical system is Dm, it is preferable to satisfy the Conditional Expression (6), and it is more preferable to satisfy the Conditional Expression (6-1).

$$0.6 < DG12/Dm < 1.5 \quad (6)$$

$$0.7 < DG12/Dm < 1.2 \quad (6-1)$$

A projection display device of the present invention comprises: a light source; a light valve into which light emitted from the light source is incident; and the projection optical system of the present invention. It is preferable that the projection optical system projects an optical image using modulated light, which is modulated through the light valve, onto a screen.

In a case where the projection optical system of the present invention is applied to a projection display device, the "magnification side" means a projection target side (screen side), the "reduction side" means an original image display region side (light valve side).

In the present specification, the sign of the refractive power (also referred to as a power) and the surface shape of the optical surface will be considered in terms of the paraxial region unless otherwise specified. Further, the values used in the above conditional expressions are values in a case where the distance from the magnification side imaging surface to the lens surface closest to the magnification side is set to be infinite and the d line (a wavelength of 587.6 nm (nanometers)) is set as a reference. The sign of Mr is negative in a case where the reflective surface is convex.

In the present description, it should be noted that the terms "consisting of ~" and "consists of ~" are used in a substantial sense, and mean that the imaging lens may include not only the above-mentioned elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

According to the present invention, it is possible to provide a projection optical system that is composed of combination of a reflective optical system and a refractive optical system so as to form an intermediate image and that has high optical performance by achieving a wide angle and satisfactorily correcting various aberrations without enlarging the reflective optical system, and a projection display device comprising the projection optical system.

DESCRIPTION OF THE PREFERRED EMBODIMENTS

Figure 1:
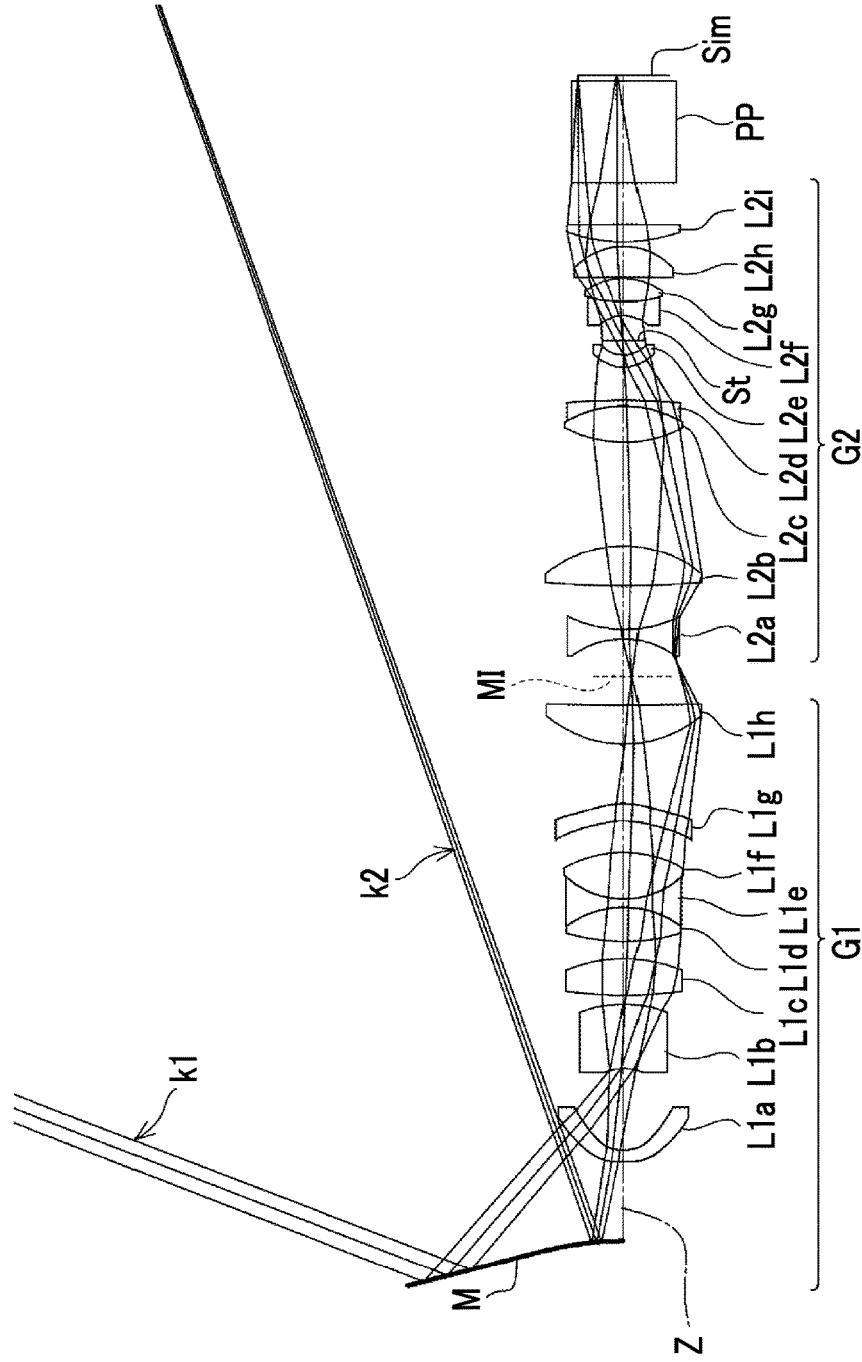
FIG. 1 is a cross-sectional view illustrating a configuration and an optical path of a projection optical system of Example 1 of the present invention.

Hereinafter, embodiments of the present invention will be described with reference to drawings. FIG. 1 is a cross-sectional view illustrating a configuration of a projection optical system according to an embodiment of the present invention. The exemplary configuration shown in FIG. 1 corresponds to Example 1 to be described later. In FIG. 1, the left side is the magnification side, and the right side is the reduction side, and rays with the maximum angle of view k1 and rays with a low angle of view k2 are also shown.

In FIG. 1, assuming that the projection optical system is mounted on a projection display device, the screen Scr, the optical member PP and the image display surface Sim of the light valve are also illustrated. The optical member PP is a member of which an incident surface and an exit surface are parallel, and is a member such as a prism, a filter, or a cover glass used in the color synthesizing section or the illumination light separating section. The optical member PP is not an indispensable component, and the optical member PP may be configured to be omitted.

In a case where the configuration shown in FIG. 1 is applied to the projection display device, rays, which are made to have image information through the image display surface Sim, are incident into the projection optical system through the optical member PP, and are transmitted onto a screen (not shown in the drawing) through the projection optical system. That is, the image display surface Sim corresponds to the reduction side imaging surface, and the screen corresponds to the magnification side imaging surface.

The projection optical system is an optical system that forms an intermediate image MI at a position conjugate to a reduction side imaging surface and forms the intermediate image again on a magnification side imaging surface. The projection optical system consists of, in order from the magnification side to the reduction side, a first optical system G1, and a second optical system G2. The second optical system G2 forms an intermediate image MI at a position conjugate to a reduction side imaging surface, and the first optical system G1 forms a final image, which is conjugate to the intermediate image MI, on a magnification side imaging surface. In the example of FIG. 1, the intermediate image MI is positioned between the first optical system G1 and the second optical system G2. In FIG. 1, the intermediate image MI is conceptually shown, and a part of the intermediate image MI including the vicinity of the optical axis is indicated by the dotted line, and a position of the intermediate image MI in the direction of the optical axis is basically shown as the position in the vicinity of the optical axis.

The first optical system G1 consists of one convex mirror M and a plurality of lenses disposed on the reduction side of the convex mirror M. The convex mirror M is a mirror having a convex reflective surface and is disposed to be closest to the magnification side of the whole system. The second optical system G2 is configured to include a plurality of lenses. That is, the projection optical system consists of a reflective optical system and a refractive optical system. Among them, the reflective optical system consists of a convex mirror M, and the refractive optical system comprises all the lenses included in the first optical system G1 and all the lenses included in the second optical system 2G.

In the example shown in FIG. 1, the first optical system G1 consists of, in order from the magnification side to the reduction side, a convex mirror M and eight lenses L1$a$, L1$b$, L1$c$, L1$d$, L1$e$, L1$f$, L1$g$, and L1$h$. The second optical system G2 comprises, in order from the magnification side to the reduction side, only nine lenses L2$a$, L2$b$, L2$c$, L2$d$, L2$e$, L2$f$, L2$g$, L2$h$, and L2$i$ as lenses having refractive powers. An aperture stop St is disposed between the lens L2$e$ and the lens L2$f$. However, the example shown in FIG. 1 is just an example, and the number of lenses of each of the first optical system G1 and the second optical system G2 may be set to be different from that in the example shown in FIG. 1.

In the projection optical system configured to form the intermediate image as described above, the back focal length of the first optical system G1 can be shortened, the diameter of the optical element closest to the magnification side in the first optical system G1, that is, the mirror diameter in the present embodiment can be reduced, and the focal length of the whole system can be shortened. Thereby, an optical system suitable for achieving a wide angle is realized. Further, since a convex mirror is disposed to be closest to the magnification side, it is possible to correct off-axis rays at a high position without generating lateral chromatic aberration, and there is an advantage in aberration correction.

The lens L1$a$ closest to the magnification side in the first optical system G1 is a negative lens. Since the lens L1$a$ closest to the magnification side is set to be a negative lens, it becomes easy to achieve the wide angle, and there is an advantage in correction of distortion.

The second lens L1$b$ from the magnification side in the first optical system G1 is also preferably a negative lens. Since the second lens L1$b$ from the magnification side is set to be a negative lens, there is an advantage in correction of off-axis aberration, in particular, correction of astigmatism.

Further, assuming that a paraxial radius of curvature of the convex mirror M is Mr and a focal length of the negative lens closest to the magnification side in the first optical system G1 is fL1, the projection optical system is configured to satisfy Conditional Expression (1). Here, the sign of Mr is negative in a case where the reflective surface is convex. Since the definition of the sign of Mr is considered and the lens L1$a$ closest to the magnification side is a negative lens, 0<Mr/fL1. Conditional Expression (1) is an expression relating to the relative strength between the power of the convex mirror M and the power of the lens L1$a$ closest to the magnification side. By not allowing the result of Conditional Expression (1) to be equal to or greater than the upper limit, it is possible to prevent the power of the convex mirror M from becoming relatively excessively weak, or it is possible to prevent the power of the lens closest to the magnification side L1$a$ from becoming relatively excessively strong. Thereby, it is possible to ensure the contribution ratio of the convex mirror M. As a result, it becomes easy to achieve both a wide angle and a small diameter of the convex mirror M.

$$0<Mr/fL1<4.5 \tag{1}$$

Further, it is preferable to satisfy Conditional Expression (1-1). By not allowing the result of Conditional Expression (1-1) to be equal to or less than the lower limit, it is possible to prevent the power of the convex mirror M from becoming relatively excessively strong, or it is possible to prevent the power of the lens closest to the magnification side L1$a$ from becoming relatively excessively weak. Thereby, it is possible to prevent the load on the convex mirror M from becoming excessively large. Thus, it becomes easy to correct distortion and field curvature, which is generated by the convex mirror M, with the lens closer to the reduction side than the convex mirror M.

$$0.5<Mr/fL1<4 \tag{1-1}$$

In the projection optical system, assuming that a composite focal length of all lenses positioned to be closer to the reduction side than the convex mirror M is fR and a focal length of the projection optical system is f, it is preferable to satisfy the Conditional Expression (2). fR is the composite focal length of the optical members other than the convex mirror M among the optical members composing the projection optical system, and is the focal length of the above-mentioned refractive optical system. By not allowing the result of Conditional Expression (2) to be equal to or less than the lower limit, the refractive power of the refractive optical system can be minimized, and the ratio of contribution of the convex mirror M to the wide angle can be secured. By not allowing the result of Conditional Expression (2) to be equal to or greater than the upper limit, the refractive power of the refractive optical system can be ensured, and it becomes easy to correct distortion, field curvature, and lateral chromatic aberration. In addition, in a case of a configuration in which Conditional Expression (2-1) is satisfied instead of Conditional Expression (2), it is possible to obtain more favorable characteristics.

$$1.5<|fR/f|<3.5 \tag{2}$$

$$1.6<|fR/f|<2.6 \tag{2-1}$$

Assuming that a focal length of the first optical system G1 is f1 and a focal length of the second optical system G2 is f2, it is preferable to satisfy the Conditional Expression (3). By not allowing the result of Conditional Expression (3) to be equal to or less than the lower limit, there is an advantage in keeping balance favorable between the first optical system G1 and the second optical system G2. As a result, it becomes easy to correct spherical aberration, and it is possible to suppress the increase in diameter of the lens on the intermediate image MI side in the second optical system G2. By not allowing the result of Conditional Expression (3) to be equal to or greater than the upper limit, it is possible to prevent the load of the second optical system G2 caused by the wide angle from becoming excessively large. As a result, it becomes easy to correct distortion, and it is possible to suppress the increase in diameter of the lens on the intermediate image MI side in the first optical system G1. In addition, in a case of a configuration in which Conditional Expression (3-1) is satisfied instead of Conditional Expression (3), it is possible to obtain more favorable characteristics.

$$0.03<f1/f2<0.25 \tag{3}$$

$$0.05<f1/f2<0.22 \tag{3-1}$$

Assuming that a focal length of an air lens formed of a reduction side lens surface of the lens L1a closest to the magnification side in the first optical system G1 and a magnification side lens surface of the second lens L1b from the magnification side in the first optical system G1 is fA and a focal length of the projection optical system is f, it is preferable to satisfy the Conditional Expression (4). By not allowing the result of Conditional Expression (4) to be equal to or less than the lower limit, it is possible to prevent the refractive power of the air lens from becoming excessively weak, and it is possible to suppress occurrence of astigmatism. By not allowing the result of Conditional Expression (4) to be equal to or greater than the upper limit, it is possible to prevent the refractive power of the air lens from becoming excessively strong. Thereby, it is possible to prevent the distance between the lens L1a and the lens L1b from becoming excessively wide, and it is possible to suppress the increase in diameter of the lens L1a. In addition, in a case of a configuration in which Conditional Expression (4-1) is satisfied instead of Conditional Expression (4), it is possible to obtain more favorable characteristics.

$$-8 < fA/|f| < -2 \quad (4)$$

$$-7 < fA/|f| < -2.4 \quad (4\text{-}1)$$

The focal length of the air lens formed by the reduction side lens surface of the lens L1a closest to the magnification side in the first optical system G1 and the magnification side lens surface of the second lens L1b from the magnification side in the first optical system G1 can be obtained from the following expression. In the following expression, the refractive index of the lens L1a at the d-line is Na, the refractive index of the lens L1b at the d-line is Nb, the paraxial radius of curvature of the reduction side lens surface of the lens L1a is Ra, the paraxial radius of curvature of the magnification side lens surface of the lens L1b is Rb, and the distance on the optical axis between the lens L1a and the lens L1b is Dab.

$$\frac{1}{fA} = \left\{ \frac{1-Na}{Rar} + \frac{Nb-1}{Rbf} - \frac{(1-Na) \times (Nb-1) \times Dab}{Rar \times Rbf} \right\} \times \frac{1}{Nb}$$

Assuming that an Abbe number of the second lens L1b from the magnification side in the first optical system G1 at the d line is vd2, it is preferable to satisfy the Conditional Expression (5). By selecting a material so as to satisfy Conditional Expression (5), it is possible to satisfactorily correct lateral chromatic aberration. By not allowing the result of Conditional Expression (5) to be equal to or less than the lower limit, it becomes easy to configure the lens system while suppressing the costs. In a case where the second lens L1b from the magnification side in the first optical system G1 is a negative lens, satisfying Conditional Expression (5) makes it easier to correct lateral chromatic aberration. In addition, in a case of a configuration in which Conditional Expression (5-1) is satisfied instead of Conditional Expression (5), it is possible to obtain more favorable characteristics.

$$10 < vd2 < 40 \quad (5)$$

$$15 < vd2 < 35 \quad (5\text{-}1)$$

In this projection optical system, it is preferable that the first optical system G1 and the second optical system G2 have a common optical axis Z. That is, all of the convex mirror M, all the lenses included in the first optical system G1, and all the lenses included in the second optical system G2 preferably have a common optical axis Z. Since the first optical system G1 and the second optical system G2 including the convex mirror M have the common optical axis Z, the structure of the entire projection optical system can be simplified, and this configuration contributes to cost reduction. It should be noted that the common optical axis described herein also includes a substantially common optical axis. For example, the common optical axis includes a production tolerance range which does not significantly degrade the performance of the optical system.

In a case where the first optical system G1 and the second optical system G2 have the common optical axis Z, assuming that an air gap on the optical axis Z between the first optical system G1 and the second optical system G2 is DG12 and an air gap on the optical axis Z between the convex mirror M and the lens L1a closest to the magnification side in the first optical system G1 is Dm, it is preferable to satisfy the Conditional Expression (6). By not allowing the result of Conditional Expression (6) to be equal to or less than the lower limit, the air gap between the convex mirror M and the lens L1a closest to the magnification side in the first optical system G1 can be prevented from becoming excessively large. As a result, it is possible to suppress the increase in size of convex mirror M. By not allowing the result of Conditional Expression (6) to be equal to or less than the lower limit, it is possible to prevent the air gap between the first optical system G1 and the second optical system G2 from becoming excessively small, and it is possible to adopt a configuration in which no lens is disposed in the vicinity of the intermediate image MI. Thus, it is possible to prevent reflection of scratches or the like on the final image. By not allowing the result of Conditional Expression (6) to be equal to or greater than the upper limit, the length of the air gap between the first optical system G1 and the second optical system G2 can be minimized, and the total length of the lens system can be minimized. In addition, in a case of a configuration in which Conditional Expression (6-1) is satisfied instead of Conditional Expression (6), it is possible to obtain more favorable characteristics.

$$0.6 < DG12/Dm < 1.5 \quad (6)$$

$$0.7 < DG12/Dm < 1.2 \quad (6\text{-}1)$$

The above-mentioned preferred configurations and available configurations may be arbitrary combinations, and it is preferable to selectively adopt the configurations in accordance with required specification. According to the present embodiment, it is possible to realize a projection optical system that has a mirror and a plurality of lenses so as to form an intermediate image and maintains high optical performance by achieving a wide angle and satisfactorily correcting various aberrations without increasing the size of the mirror. The term "wide angle" described herein means that the total angle of view is greater than 130 degrees.

Next, numerical examples of the projection optical system of the present invention will be described. It should be noted that the numerical data pieces of the following examples are all normalized such that the absolute value of the focal length of the whole system is 1.00, and are rounded up to a predetermined number of decimal places.

Example 1

A lens configuration and an optical path of a projection optical system of Example 1 are shown in FIG. 1, and a configuration and an illustration method thereof is as described above. Therefore, repeated descriptions are partially omitted herein. The projection optical system of Example 1 consists of, in order from the magnification side, a first optical system G1 and a second optical system G2. The first optical system G1 consists of, in order from the magnification side, a convex mirror M and eight lenses L1a to L1h. The second optical system G2 consists of, in order from the magnification side, five lenses L2a to L2e, an aperture stop St, and four lenses L2f to L2i.

Table 1 shows basic lens data of the projection optical system of Example 1, Table 2 shows specification, and Table 3 shows aspheric surface coefficients thereof. In Table 1, the column of the surface number shows surface numbers. The surface closest to the magnification side is the first surface, and the surface numbers increase one by one toward the reduction side. The column of R shows radii of curvature of the respective surfaces. The column of D shows surface distances on the optical axis between the respective surfaces and the surfaces adjacent to the reduction side. Further, the column of Nd shows refractive indexes of the respective components at the d line (a wavelength of 587.6 nm (nanometers)), and the column of vd shows Abbe numbers of the respective components at the d line.

In Table 1, reference signs of radii of curvature of surface shapes convex toward the magnification side are set to be positive, and reference signs of radii of curvature of surface shapes convex toward the reduction side are set to be negative. Table 1 additionally shows the aperture stop St and the optical member PP. In Table 1, the "reflective surface" is noted in the column of Nd of the surface corresponding to the convex mirror M, and the surface number and the phrase (St) are noted in the column of the surface number of the surface corresponding to the aperture stop St. The numerical value in the uppermost place in the column of D in Table 1 corresponds to the distance from the magnification side imaging surface to the convex mirror M.

Table 2 shows, as specification of the projection optical system, respective values of the absolute value |f| of the focal length, the back focal length Bf at the air conversion distance in a case where the reduction side is set as a back side, F number FNo., and the maximum total angle of view $2\omega$, on the basis of the d line. [°] in the place of $2\omega$ indicates that the unit thereof is a degree.

In Table 1, the reference sign * is attached to surface numbers of aspheric surfaces, and numerical values of the paraxial radius of curvature are written into the column of the radius of curvature of the aspheric surface. Table 3 shows surface numbers of the aspheric surfaces, and aspheric surface coefficients of the respective aspheric surfaces. The "E±n" (n: an integer) in numerical values of the aspheric surface coefficients of Table 3 indicates "$\times 10^{\pm n}$". The aspheric surface coefficients are values of the coefficients KA and Am (m=3, 4, 5, . . . , 20) in aspheric surface expression represented as the following expression.

$$Zd = C \times h^2 / \{1 + (1 - KA \times C^2 \times h^2)^{1/2}\} + \Sigma Am \times h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is a paraxial curvature, KA and Am are aspheric surface coefficients, and $\Sigma$ in the aspheric surface expression means the sum with respect to m.

TABLE 1

| Example 1 | | | | |
|---|---|---|---|---|
| Surface Number | R | D | Nd | vd |
|  |  | −127.096 |  |  |
| *1 | −19.4964 | 4.5505 | Reflective Surface |  |
| *2 | 41.3373 | 0.6538 | 1.53158 | 55.08 |
| *3 | 3.3397 | 4.6797 |  |  |
| 4 | −2.9832 | 3.6313 | 1.80518 | 25.42 |
| 5 | −7.1597 | 0.4994 |  |  |
| 6 | 25.9719 | 2.1383 | 1.89286 | 20.36 |
| 7 | −8.7961 | 0.9493 |  |  |
| 8 | 12.1924 | 1.9662 | 1.65160 | 58.55 |
| 9 | −5.7704 | 0.4560 | 1.84666 | 23.78 |
| 10 | 5.1477 | 2.6631 | 1.53775 | 74.70 |
| 11 | −7.3726 | 1.8049 |  |  |
| *12 | −4.9313 | 0.9909 | 1.51007 | 56.24 |
| *13 | −4.1793 | 3.3856 |  |  |
| 14 | 7.1720 | 2.2312 | 1.80000 | 29.84 |
| 15 | 115.9821 | 3.8185 |  |  |
| 16 | −5.2549 | 0.5446 | 1.58913 | 61.13 |
| 17 | 7.8130 | 2.4791 |  |  |
| 18 | 51.4570 | 2.3199 | 1.77250 | 49.60 |
| 19 | −7.2478 | 5.9148 |  |  |
| 20 | 7.5632 | 2.0950 | 1.78800 | 47.32 |
| 21 | −6.9690 | 0.3337 | 1.84666 | 23.78 |
| 22 | −46.6481 | 1.9306 |  |  |
| 23 | 2.4901 | 0.6822 | 1.80518 | 25.42 |
| 24 | 1.8379 | 0.8267 |  |  |
| 25(St) | ∞ | 1.3760 |  |  |
| 26 | −2.2231 | 0.7962 | 1.62588 | 35.70 |
| 27 | 7.9627 | 1.3216 | 1.49700 | 81.61 |
| 28 | −4.0139 | 0.1053 |  |  |
| 29 | −92.7904 | 1.7392 | 1.49700 | 81.61 |
| 30 | −4.0283 | 0.2435 |  |  |
| 31 | 9.5845 | 0.9962 | 1.72916 | 54.68 |
| 32 | −152.3456 | 2.7026 |  |  |
| 33 | ∞ | 5.8646 | 1.51633 | 64.14 |
| 34 | ∞ |  |  |  |

TABLE 2

| Example 1 | |
|---|---|
| \|f\| | 1.00 |
| Bf | 6.57 |
| FNo. | 2.00 |
| 2ω[°] | 138.8 |

TABLE 3

| Example 1 | | | |
|---|---|---|---|
| Surface Number | 1 | 2 | 3 |
| KA | 3.531517823033E−01 | 1.077727987217E+02 | 1.089666076850E+00 |
| A3 | 1.501030404624E−03 | −1.327765671580E−01 | −1.131913510215E−01 |
| A4 | −9.768646107915E−04 | 3.691811030265E−01 | 3.525223913580E−01 |
| A5 | 3.361988060752E−05 | −2.401787218822E−01 | −1.791109324330E−01 |
| A6 | 5.477662417900E−05 | 4.562025809181E−03 | −1.165803153364E−01 |

TABLE 3-continued

Example 1

| | | | |
|---|---|---|---|
| A7 | −5.240918419781E−06 | 7.050492972831E−02 | 1.579114897989E−01 |
| A8 | −1.229918705327E−06 | −2.425592962243E−02 | −1.948030697406E−02 |
| A9 | 1.774015200670E−07 | −8.767850018532E−03 | −4.266429793852E−02 |
| A10 | 1.321446959589E−08 | 6.369154908479E−03 | 1.312795776927E−02 |
| A11 | −2.939507476279E−09 | −6.997837199031E−06 | 6.883554193968E−03 |
| A12 | −4.888399941398E−11 | −7.451091518193E−04 | −2.994717431046E−03 |
| A13 | 2.770384946950E−11 | 1.138175774985E−04 | −6.496764146345E−04 |
| A14 | −3.497668158758E−13 | 4.189962500117E−05 | 3.631324101141E−04 |
| A15 | −1.514847884985E−13 | −1.199552949259E−05 | 3.636598191804E−05 |
| A16 | 4.557796049357E−15 | −7.593482102834E−07 | −2.548276552361E−05 |
| A17 | 4.480740506852E−16 | 5.225606853583E−07 | −1.062749726204E−06 |
| A18 | −1.863726845198E−17 | −2.294805043587E−08 | 9.609789941744E−07 |
| A19 | −5.550148460603E−19 | −8.564793616683E−09 | 1.272047581428E−08 |
| A20 | 2.759145250815E−20 | 8.532013360197E−10 | −1.520987579422E−08 |

| Surface Number | 12 | 13 |
|---|---|---|
| KA | 1.000000000000E+00 | 1.000000000000E+00 |
| A3 | −2.227492911325E−03 | −2.538013673743E−03 |
| A4 | 4.063876592790E−03 | 1.091035753319E−02 |
| A5 | 1.809673199911E−02 | 5.418878143466E−03 |
| A6 | −1.230988827127E−02 | −1.687216398111E−03 |
| A7 | −3.776167347919E−03 | −3.002681191533E−03 |
| A8 | 5.939568396606E−03 | 1.140765516621E−03 |
| A9 | −4.744229716872E−04 | 8.523916935080E−04 |
| A10 | −1.321466503168E−03 | −5.103860653863E−04 |
| A11 | 3.503591891641E−04 | −5.793545428653E−05 |
| A12 | 1.404436555611E−04 | 8.614487714219E−05 |
| A13 | −6.185277953832E−05 | −6.794921015464E−06 |
| A14 | −5.810197796232E−06 | −6.773547736541E−06 |
| A15 | 5.259712360923E−06 | 1.287045865290E−06 |
| A16 | −1.462856178957E−07 | 2.233404545603E−07 |
| A17 | −2.224591683839E−07 | −7.335655212592E−08 |
| A18 | 2.063563759948E−08 | −3.966046920239E−11 |
| A19 | 3.754854257202E−09 | 1.466292871897E−09 |
| A20 | −4.986968961128E−10 | −1.112789844347E−10 |

Figure 5:
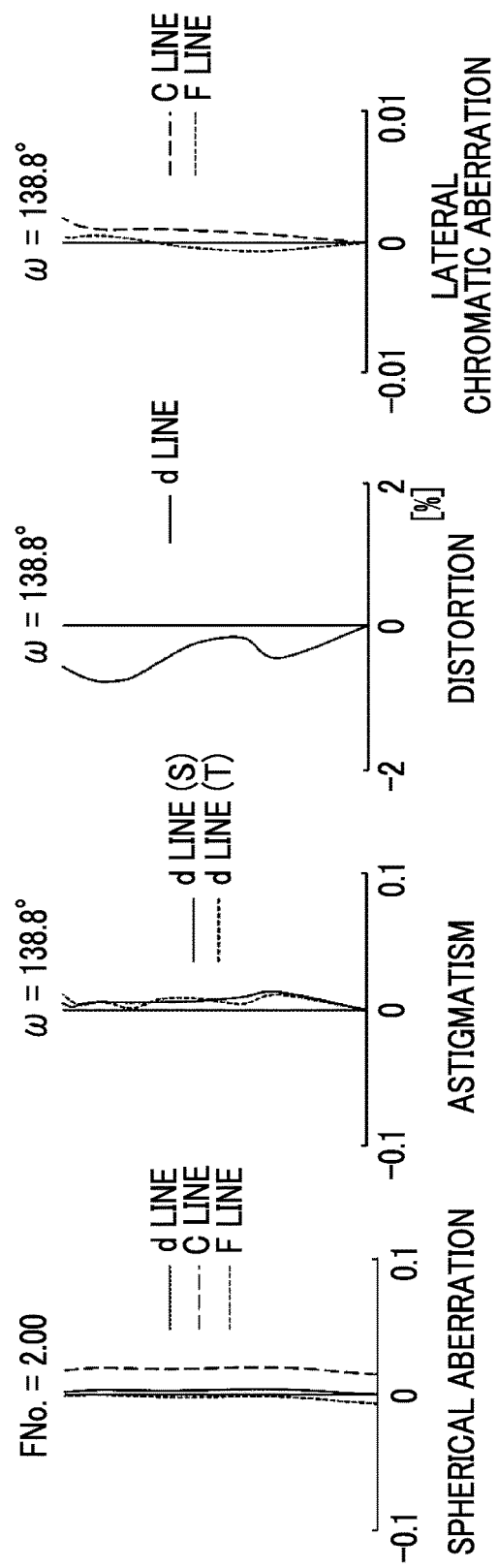
FIG. 5 is a diagram of aberrations of the projection optical system of Example 1 of the present invention.

FIG. 5 shows aberration diagrams of spherical aberration, astigmatism, distortion, and lateral chromatic aberration of the projection optical system of Example 1 in order from the left side. In the spherical aberration diagram, aberrations at the d line (a wavelength of 587.6 nm), the C line (a wavelength of 656.3 nm), and the F line (a wavelength of 486.1 nm) are respectively indicated by the solid line, the long dashed line, and the short dashed line. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration diagram, aberrations at the C line and the F line are respectively indicated by the long dashed line and the short dashed line. In the spherical aberration diagram, FNo. indicates an F number. In the other aberration diagrams, ω indicates a half angle of view. The aberration diagrams are diagrams in a case where the distance from the magnification side imaging surface to the convex mirror M is a value shown in Table 1.

In the description of Example 1, reference signs, meanings, and description methods of the respective data pieces are the same as those in the following examples unless otherwise noted. Therefore, in the following description, repeated description will be omitted.

Example 2

Figure 2:
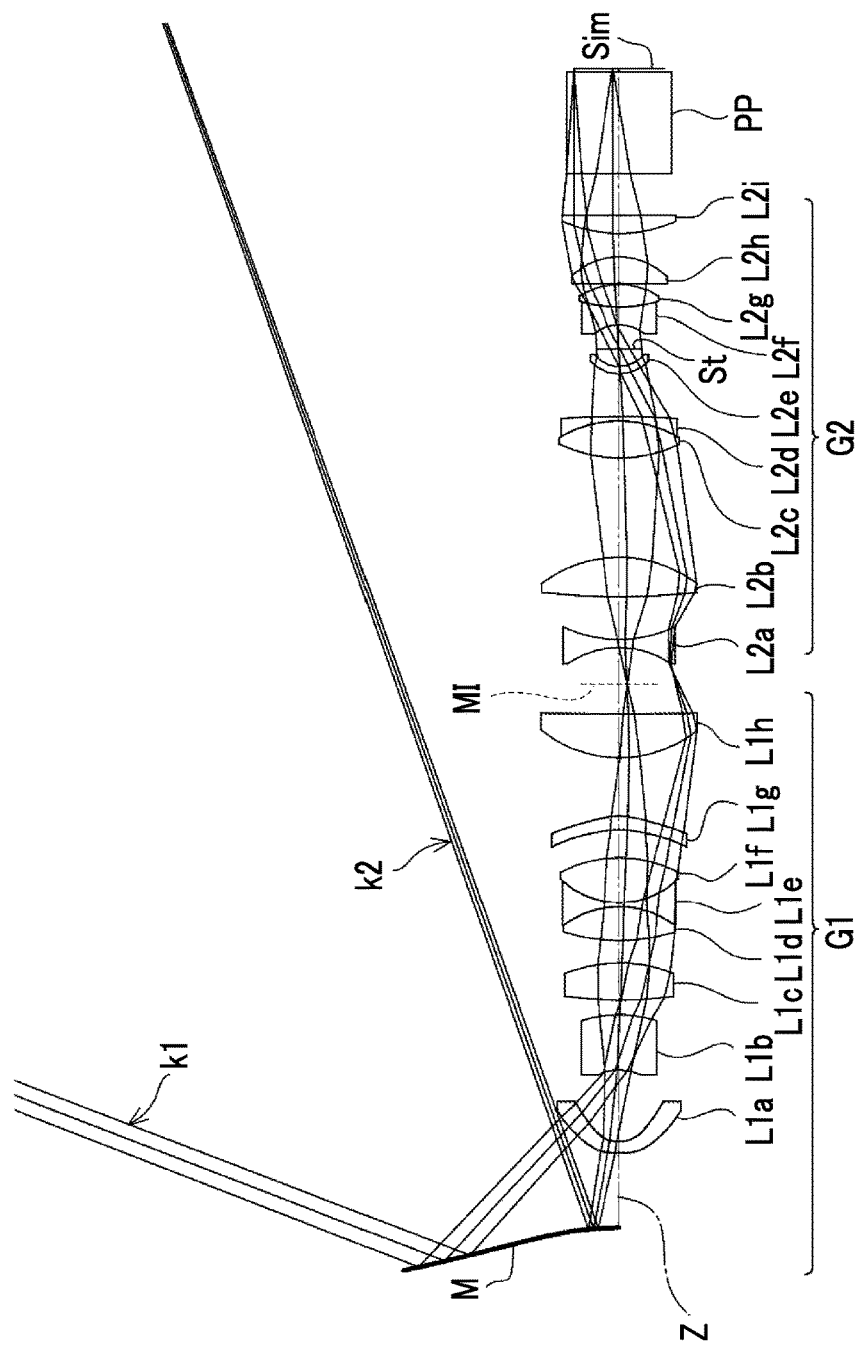
FIG. 2 is a cross-sectional view illustrating a configuration and an optical path of a projection optical system of Example 2 of the present invention.

FIG. 2 is a cross-sectional view of a lens configuration and an optical path of a projection optical system of Example 2. The projection optical system of Example 2 consists of, in order from the magnification side, a first optical system G1 and a second optical system G2. The first optical system G1 consists of, in order from the magnification side, a convex mirror M and eight lenses L1a to L1h. The second optical system G2 consists of, in order from the magnification side, five lenses L2a to L2e, an aperture stop St, and four lenses L2f to L2i.

Figure 6:
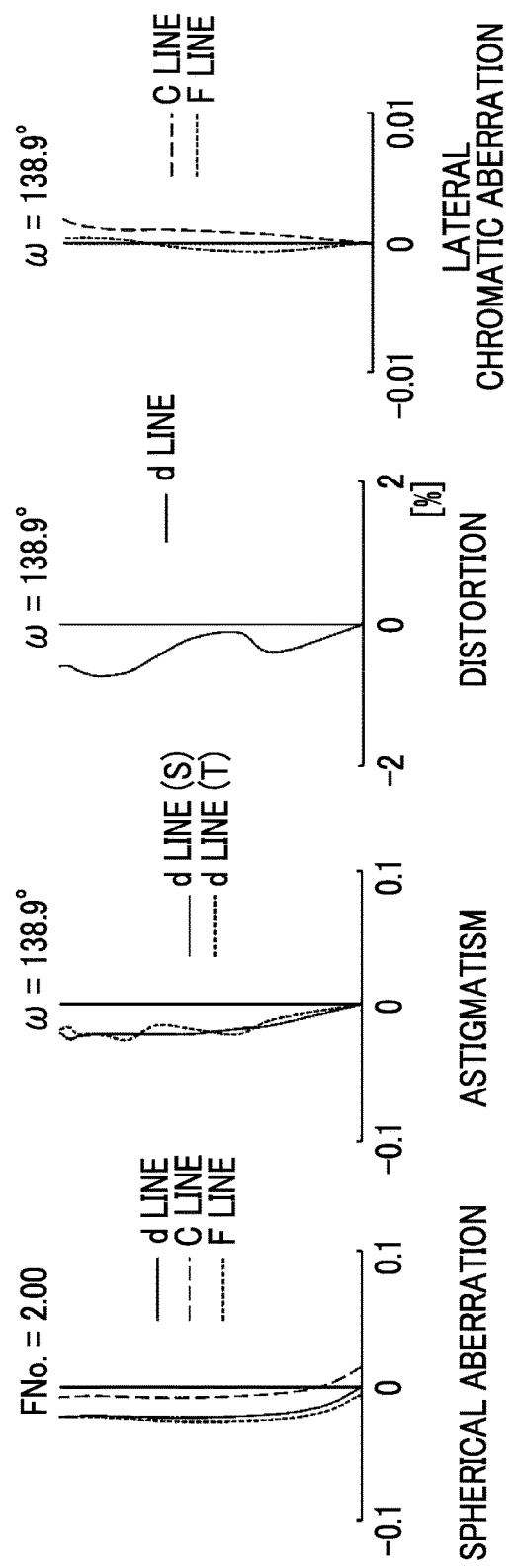
FIG. 6 is a diagram of aberrations of the projection optical system of Example 2 of the present invention.

Table 4 shows basic lens data of the projection optical system of Example 2, Table 5 shows specification, Table 6 shows aspheric surface coefficients, and FIG. 6 shows aberration diagrams. The aberration diagrams are diagrams in a case where the distance from the magnification side imaging surface to the convex mirror M is a value shown in Table 4.

TABLE 4

Example 2

| Surface Number | R | D | Nd | vd |
|---|---|---|---|---|
| | | −127.201 | | |
| *1 | −20.397 | 4.3087 | Reflective Surface | |
| *2 | 42.4875 | 0.6542 | 1.53158 | 55.08 |
| *3 | 2.7105 | 4.0918 | | |
| 4 | −3.0187 | 3.1930 | 1.75520 | 27.51 |
| 5 | −7.1712 | 0.7684 | | |
| 6 | 23.4501 | 2.1806 | 1.89286 | 20.36 |
| 7 | −8.8576 | 1.2928 | | |
| 8 | 11.3669 | 1.9481 | 1.65160 | 58.55 |
| 9 | −5.6287 | 0.2452 | 1.84666 | 23.78 |
| 10 | 5.1213 | 2.5890 | 1.53775 | 74.70 |
| 11 | −7.7706 | 1.6028 | | |
| *12 | −5.4179 | 0.7847 | 1.51007 | 56.24 |
| *13 | −4.1515 | 3.3592 | | |
| 14 | 7.5923 | 2.5191 | 1.80100 | 34.97 |

TABLE 4-continued

Example 2

| Surface Number | R | D | Nd | vd |
|---|---|---|---|---|
| 15 | 315.2503 | 3.8407 | | |
| 16 | -5.4932 | 0.4326 | 1.58267 | 46.42 |
| 17 | 7.8838 | 2.4610 | | |
| 18 | 42.5278 | 2.2898 | 1.78800 | 47.37 |
| 19 | -7.7059 | 5.6796 | | |
| 20 | 8.4141 | 2.1420 | 1.80400 | 46.58 |
| 21 | -6.9473 | 0.2542 | 1.84666 | 23.78 |
| 22 | -48.9831 | 2.4580 | | |
| 23 | 2.4540 | 0.4287 | 1.69895 | 30.13 |
| 24 | 1.9513 | 1.0052 | | |
| 25(St) | ∞ | 1.3996 | | |
| 26 | -2.4222 | 0.9599 | 1.59551 | 39.24 |
| 27 | 8.3222 | 1.3047 | 1.49700 | 81.61 |
| 28 | -4.4839 | 0.0660 | | |
| 29 | -85.3914 | 1.4995 | 1.49700 | 81.61 |
| 30 | -4.1432 | 1.3628 | | |
| 31 | 8.7165 | 1.0317 | 1.69680 | 55.53 |
| 32 | 232.6726 | 2.3805 | | |
| 33 | ∞ | 5.8694 | 1.51633 | 64.14 |
| 34 | ∞ | | | |

TABLE 5

| Example 2 | |
|---|---|
| |f| | 1.00 |
| Bf | 6.45 |
| FNo. | 2.00 |
| 2ω[°] | 138.9 |

TABLE 6

Example 2

| Surface Number | 1 | 2 | 3 |
|---|---|---|---|
| KA | 4.537514111053E-01 | 1.257784966106E+02 | 8.260569596242E-01 |
| A3 | 1.110299279673E-03 | -1.243051350350E-01 | -1.347031859684E-01 |
| A4 | -9.853125147234E-04 | 4.114883950985E-01 | 4.719930934516E-01 |
| A5 | 5.340623949575E-05 | -2.932957431451E-01 | -2.759131366671E-01 |
| A6 | 5.554493334923E-05 | 1.270257471454E-02 | -1.801839195316E-01 |
| A7 | -5.936735189476E-06 | 9.089852238351E-02 | 2.772749437989E-01 |
| A8 | -1.247918043068E-06 | -3.422172060134E-02 | -3.818646733702E-02 |
| A9 | 1.940741592492E-07 | -1.186406076485E-02 | -8.709405843660E-02 |
| A10 | 1.325503230163E-08 | 9.442086366085E-03 | 2.887991910981E-02 |
| A11 | -3.196297099607E-09 | -9.131074895250E-05 | 1.635712007709E-02 |
| A12 | -4.433900782206E-11 | -1.179309930794E-03 | -7.638294318489E-03 |
| A13 | 3.017604344768E-11 | 1.936242277300E-04 | -1.798070643150E-03 |
| A14 | -4.303276651765E-13 | 7.102661860693E-05 | 1.079032031457E-03 |
| A15 | -1.657942160189E-13 | -2.153612499748E-05 | 1.171672260454E-04 |
| A16 | 5.177883363366E-15 | -1.371378013999E-06 | -8.839117425316E-05 |
| A17 | 4.934684770072E-16 | 1.003473934124E-06 | -3.979390911246E-06 |
| A18 | -2.096055566634E-17 | -4.572518925574E-08 | 3.895093433468E-06 |
| A19 | -6.155439310878E-19 | -1.765308217186E-08 | 5.517685381523E-08 |
| A20 | 3.104398731658E-20 | 1.814261384300E-09 | -7.208734111971E-08 |

| Surface Number | 12 | 13 |
|---|---|---|
| KA | 1.000000000000E+00 | 1.000000000000E+00 |
| A3 | 1.120338685336E-03 | -4.157832073960E-03 |
| A4 | -5.108574792890E-03 | 1.195520896409E-02 |
| A5 | 2.502754962011E-02 | 5.292791560705E-03 |
| A6 | -1.148003884383E-02 | -1.762135069895E-03 |
| A7 | -8.013070525196E-03 | -3.134044758392E-03 |
| A8 | 7.190622966439E-03 | 1.011467238451E-03 |
| A9 | 4.966059196243E-04 | 9.947809154677E-04 |
| A10 | -1.853633733967E-03 | -4.804289257095E-04 |
| A11 | 2.737683818921E-04 | -9.954191921214E-05 |
| A12 | 2.313114612633E-04 | 8.513764158623E-05 |
| A13 | -6.638935184335E-05 | -9.167633544722E-07 |
| A14 | -1.345975636091E-05 | -7.152599990976E-06 |
| A15 | 6.480284965266E-06 | 8.427115834461E-07 |
| A16 | 1.409148117761E-07 | 2.751565385210E-07 |
| A17 | -3.008457285498E-07 | -5.606206842954E-08 |
| A18 | 1.919538759353E-08 | -2.649196235972E-09 |
| A19 | 5.474052183971E-09 | 1.193725020449E-09 |
| A20 | -6.206471619978E-10 | -6.352358997404E-11 |

Example 3

Figure 3:
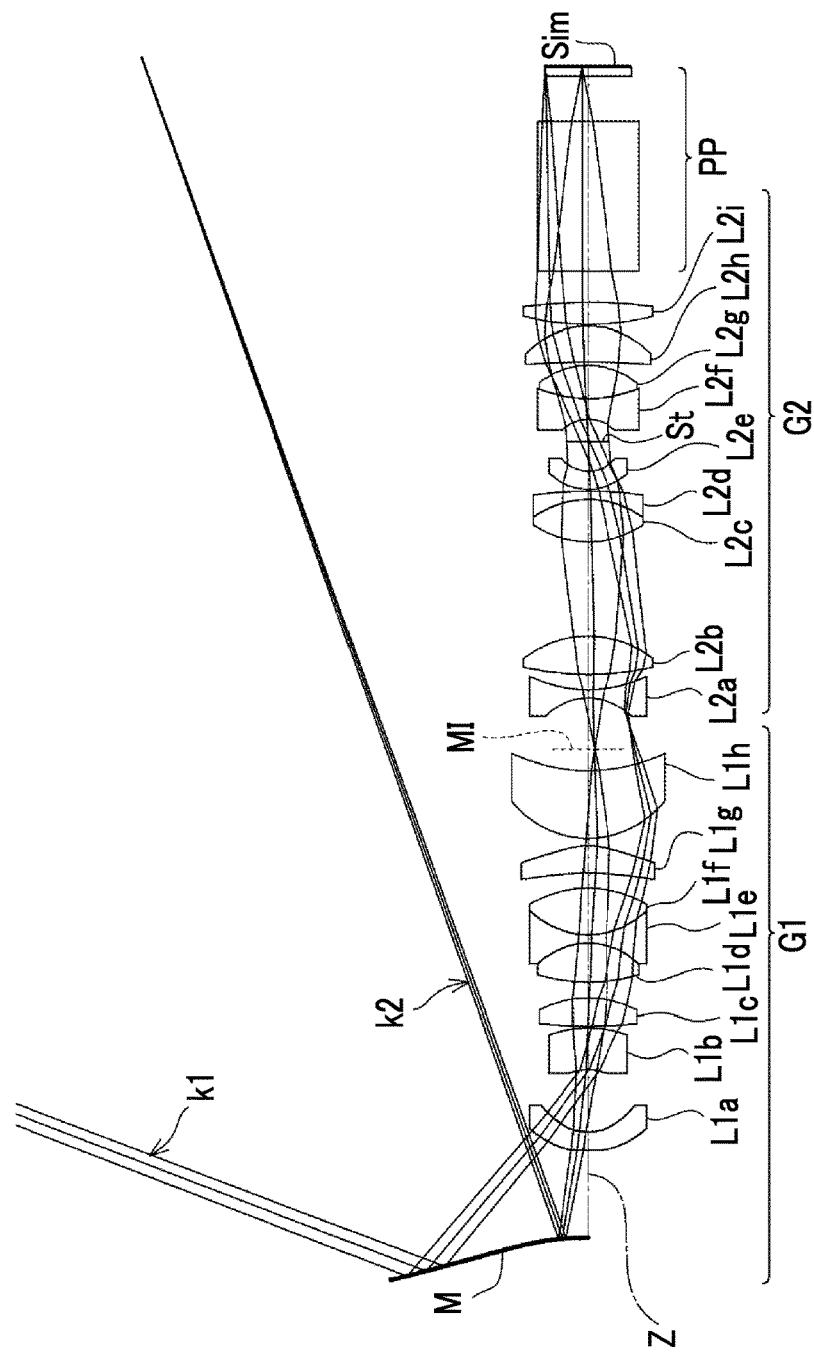
FIG. 3 is a cross-sectional view illustrating a configuration and an optical path of a projection optical system of Example 3 of the present invention.

FIG. 3 is a cross-sectional view of a lens configuration and an optical path of a projection optical system of Example 3. The projection optical system of Example 3 consists of, in order from the magnification side, a first optical system G1 and a second optical system G2. The first optical system G1 consists of, in order from the magnification side, a convex mirror M and eight lenses L1a to L1h. The second optical system G2 consists of, in order from the magnification side, five lenses L2a to L2e, an aperture stop St, and four lenses L2f to L2i. In the example of FIG. 3, two members, of which the incident surface and the exit surface are parallel, are collectively shown as the optical member PP.

Figure 7:
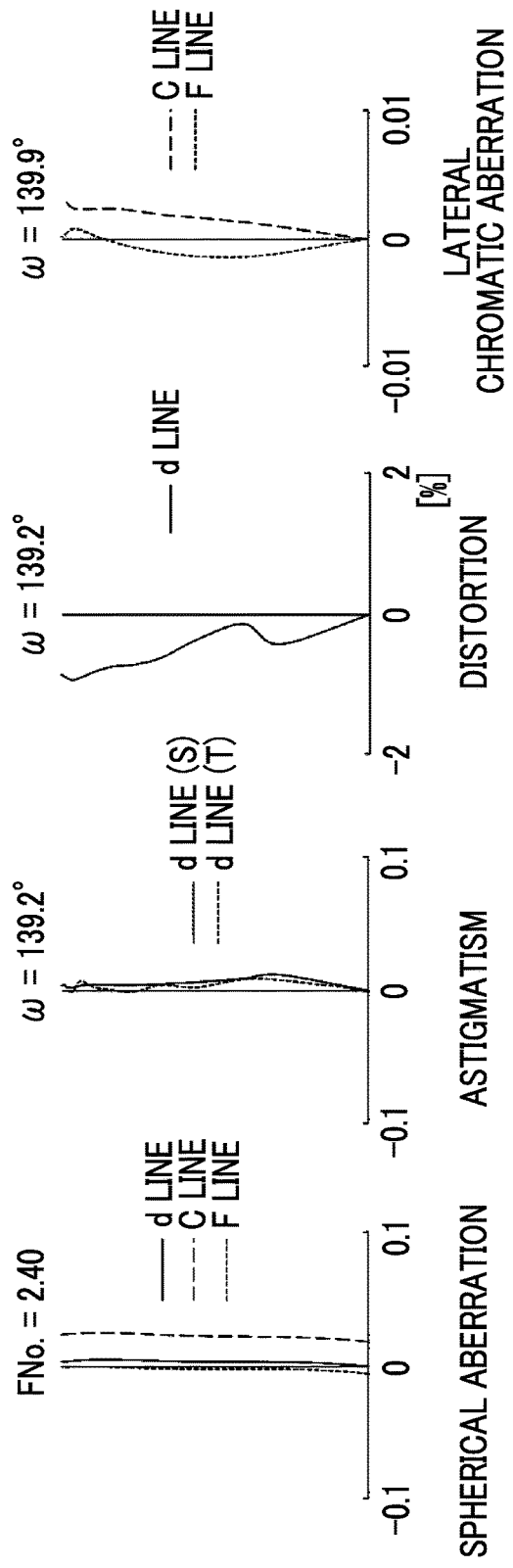
FIG. 7 is a diagram of aberrations of the projection optical system of Example 3 of the present invention.

Table 7 shows basic lens data of the projection optical system of Example 3, Table 8 shows specification, Table 9 shows aspheric surface coefficients, and FIG. 7 shows aberration diagrams. The aberration diagrams are diagrams in a case where the distance from the magnification side imaging surface to the convex mirror M is a value shown in Table 7.

TABLE 7

| Surface Number | R | D | Nd | vd |
|---|---|---|---|---|
|  |  | −78.8477 |  |  |
| *1 | −16.867 | 5.2837 | Reflective Surface |  |
| *2 | 30.9222 | 1.1083 | 1.58313 | 59.38 |
| *3 | 4.2268 | 3.7952 |  |  |
| 4 | −3.2096 | 2.4964 | 1.80518 | 25.42 |
| 5 | −7.4923 | 0.0985 |  |  |
| 6 | 29.8298 | 1.7026 | 1.89286 | 20.36 |
| 7 | −6.9028 | 0.9736 |  |  |
| 8 | 11.7988 | 2.3626 | 1.65160 | 58.55 |
| 9 | −4.6934 | 0.4923 | 1.84666 | 23.78 |
| 10 | 5.3549 | 2.8263 | 1.49700 | 81.61 |

TABLE 7-continued

| Surface Number | R | D | Nd | vd |
|---|---|---|---|---|
| 11 | −7.5693 | 0.9253 |  |  |
| *12 | −9.7173 | 1.6365 | 1.58313 | 59.38 |
| *13 | −4.2659 | 0.4504 |  |  |
| 14 | 6.2569 | 4.0893 | 1.80400 | 46.58 |
| 15 | 11.6497 | 4.4930 |  |  |
| 16 | −3.7886 | 0.4933 | 1.51742 | 52.43 |
| 17 | 8.7425 | 0.9132 |  |  |
| 18 | 19.0509 | 2.3539 | 1.80610 | 40.93 |
| 19 | −6.7866 | 5.6993 |  |  |
| 20 | 6.4165 | 2.5675 | 1.71299 | 53.87 |
| 21 | −6.0587 | 0.4924 | 1.80518 | 25.42 |
| 22 | −27.1071 | 0.0989 |  |  |
| 23 | 3.6005 | 1.0973 | 1.80518 | 25.42 |
| 24 | 2.2958 | 1.7880 |  |  |
| 25(St) | ∞ | 1.3642 |  |  |
| 26 | −2.3844 | 1.2793 | 1.58144 | 40.75 |
| 27 | 8.4711 | 2.0169 | 1.49700 | 81.61 |
| 28 | −5.0720 | 0.1891 |  |  |
| 29 | −56.4439 | 2.1449 | 1.49700 | 81.61 |
| 30 | −5.5143 | 0.0981 |  |  |
| 31 | 17.1658 | 1.3477 | 1.69680 | 55.53 |
| 32 | −29.2382 | 1.9776 |  |  |
| 33 | ∞ | 9.1168 | 1.63854 | 55.38 |
| 34 | ∞ | 2.7100 |  |  |
| 35 | ∞ | 0.5421 | 1.51633 | 64.14 |
| 36 | ∞ |  |  |  |

TABLE 8

| Example 3 | |
|---|---|
| \|f\| | 1.00 |
| Bf | 10.61 |
| FNo. | 2.40 |
| 2ω[°] | 139.2 |

TABLE 9

Example 3

| Surface Number | 1 | 2 | 3 |
|---|---|---|---|
| KA | 2.160802527306E−01 | 6.068219811528E+01 | 1.774078539976E+00 |
| A3 | 4.341827903599E−03 | −1.448721493606E−01 | −7.697570427311E−02 |
| A4 | −1.829245755840E−03 | 3.070782880551E−01 | 1.936088027004E−01 |
| A5 | −1.291047286874E−05 | −1.983910595424E−01 | −7.932414977756E−02 |
| A6 | 1.108859251771E−04 | 1.649437721294E−02 | −6.428465945657E−02 |
| A7 | −9.059506643476E−06 | 4.938781697419E−02 | 6.550390327333E−02 |
| A8 | −2.770978406720E−06 | −2.217626852854E−02 | −7.221613674720E−03 |
| A9 | 3.797627075358E−07 | −4.051027313216E−03 | −1.327783321600E−02 |
| A10 | 3.343033968177E−08 | 5.107500163568E−03 | 4.165614362747E−03 |
| A11 | −7.203245123049E−09 | −5.098474964263E−04 | 1.657350331830E−03 |
| A12 | −1.442935805614E−10 | −5.317671236562E−04 | −8.248801547510E−04 |
| A13 | 7.608539342743E−11 | 1.346820338054E−04 | −1.146696454587E−04 |
| A14 | −9.689331735534E−13 | 2.460226029956E−05 | 8.738794303282E−05 |
| A15 | −4.617426506421E−13 | −1.152511790587E−05 | 4.408054060731E−06 |
| A16 | 1.471346529729E−14 | −8.326763004966E−08 | −5.494714354024E−06 |
| A17 | 1.507608577485E−15 | 4.548064934599E−07 | −6.183360681180E−08 |
| A18 | −6.686449212043E−17 | −3.218664540818E−08 | 1.874145465048E−07 |
| A19 | −2.054527134787E−18 | −6.973892844299E−09 | −1.321411156651E−10 |
| A20 | 1.092036209438E−19 | 8.035053473472E−10 | −2.709775444746E−09 |

| Surface Number | 12 | 13 |
|---|---|---|
| KA | 1.000000000000E+00 | 1.000000000000E+00 |
| A3 | −7.923224850804E−04 | −3.985657349698E−03 |
| A4 | 8.190537671986E−03 | 1.409362867373E−02 |
| A5 | 8.802561671514E−03 | 3.267858713514E−03 |
| A6 | −1.083210502923E−02 | −3.398564997080E−03 |
| A7 | 4.358224198836E−04 | −1.333441075447E−03 |

TABLE 9-continued

| | Example 3 | |
|---|---|---|
| A8 | 3.730254459053E−03 | 1.297132822934E−03 |
| A9 | −1.093864540618E−03 | 3.150184250885E−04 |
| A10 | −6.116416428856E−04 | −4.168073200925E−04 |
| A11 | 3.076676556809E−04 | 1.616408750062E−05 |
| A12 | 4.066780053954E−05 | 6.042814559549E−05 |
| A13 | −4.003875885346E−05 | −1.068100965984E−05 |
| A14 | 6.335355074396E−07 | −4.103857547122E−06 |
| A15 | 2.784058043497E−06 | 1.207474988208E−06 |
| A16 | −2.528089070731E−07 | 1.001968761220E−07 |
| A17 | −1.000128015505E−07 | −5.766780300067E−08 |
| A18 | 1.359908471247E−08 | 1.711710800980E−09 |
| A19 | 1.460493843190E−09 | 1.032034687061E−09 |
| A20 | −2.427573579640E−10 | −9.122421200689E−11 |

Example 4

Figure 4:
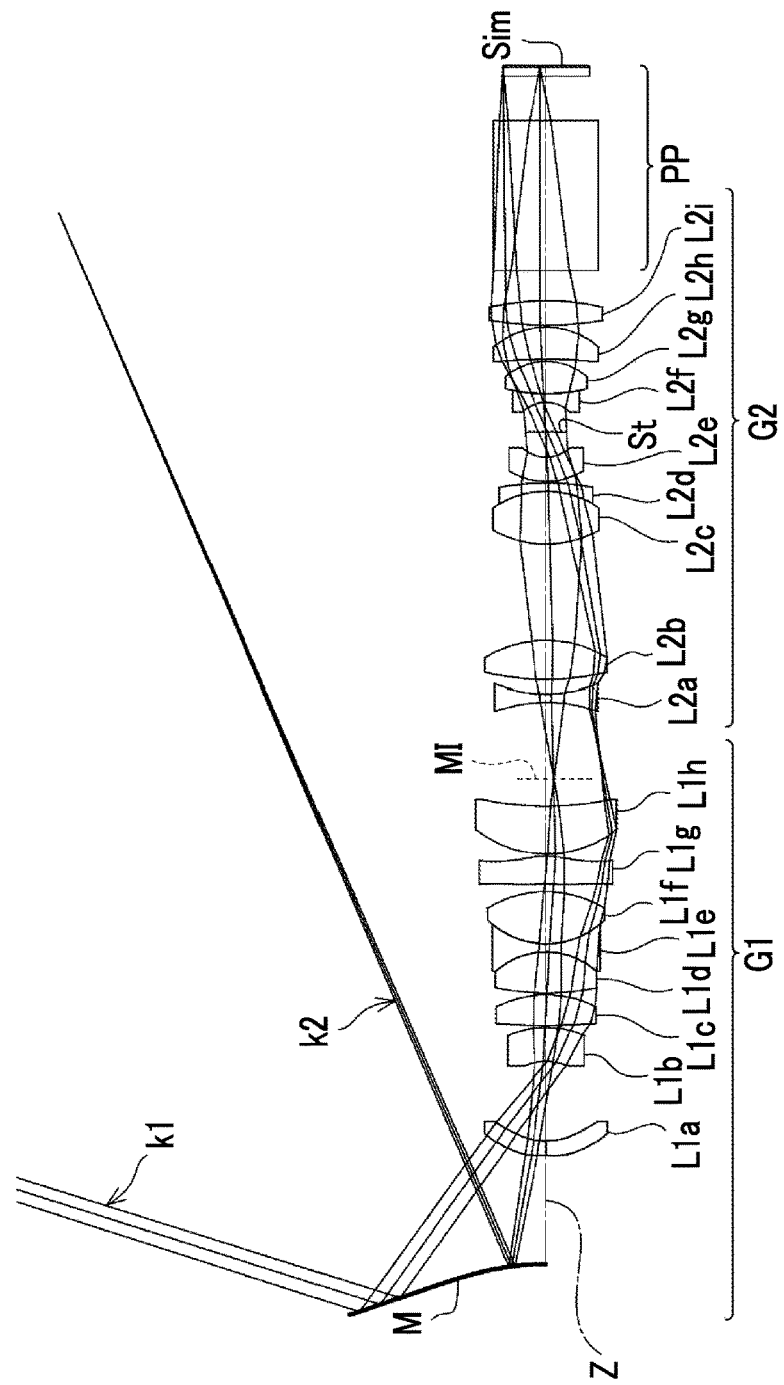
FIG. 4 is a cross-sectional view illustrating a configuration and an optical path of a projection optical system of Example 4 of the present invention.

FIG. 4 is a cross-sectional view of a lens configuration and an optical path of a projection optical system of Example 4. The projection optical system of Example 4 consists of, in order from the magnification side, a first optical system G1 and a second optical system G2. The first optical system G1 consists of, in order from the magnification side, a convex mirror M and eight lenses L1a to L1h. The second optical system G2 consists of, in order from the magnification side, five lenses L2a to L2e, an aperture stop St, and four lenses L2f to L2i. In the example of FIG. 4, two members, of which the incident surface and the exit surface are parallel, are collectively shown as the optical member PP.

Figure 8:
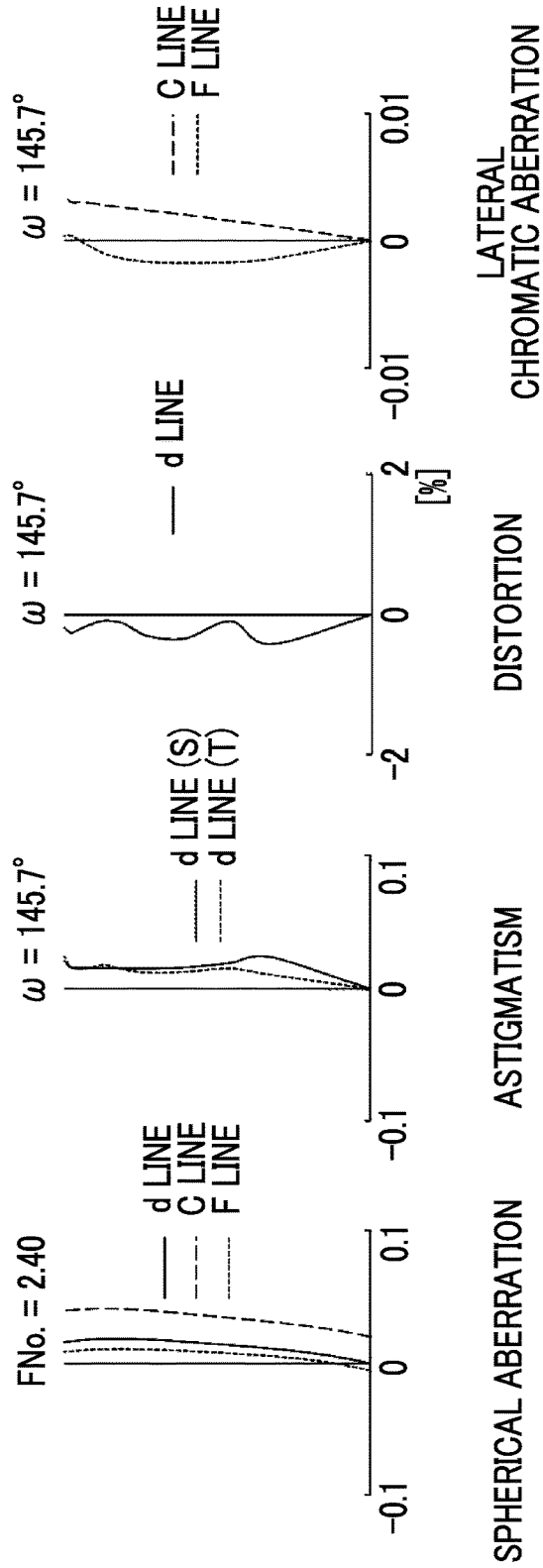
FIG. 8 is a diagram of aberrations of the projection optical system of Example 4 of the present invention.

Table 10 shows basic lens data of the projection optical system of Example 4, Table 11 shows specification, Table 12 shows aspheric surface coefficients, and FIG. 8 shows aberration diagrams. The aberration diagrams are diagrams in a case where the distance from the magnification side imaging surface to the convex mirror M is a value shown in Table 10.

TABLE 10

| | Example 4 | | | |
|---|---|---|---|---|
| Surface Number | R | D | Nd | vd |
|  |  | −77.4137 |  |  |
| *1 | −19.7173 | 7.983 | Reflective Surface |  |
| *2 | 40.9716 | 1.1382 | 1.58313 | 59.38 |
| *3 | 9.3012 | 5.8372 |  |  |
| 4 | −4.2473 | 2.5147 | 1.89286 | 20.36 |
| 5 | −7.4152 | 0.1186 |  |  |
| 6 | 42.8143 | 2.2778 | 1.89286 | 20.36 |
| 7 | −8.5893 | 0.1189 |  |  |
| 8 | 18.8217 | 3.0254 | 1.65160 | 58.55 |
| 9 | −5.8865 | 0.5955 | 1.84666 | 23.78 |
| 10 | 6.5705 | 3.8415 | 1.53775 | 74.70 |
| 11 | −8.7206 | 0.5438 |  |  |
| *12 | −17.8497 | 2.0647 | 1.58313 | 59.38 |
| *13 | −5.1432 | 0.1473 |  |  |
| 14 | 8.7379 | 3.5573 | 1.80400 | 46.58 |
| 15 | 24.3936 | 7.6052 |  |  |
| 16 | −11.7304 | 0.5950 | 1.80000 | 29.84 |
| 17 | 10.6061 | 1.0493 |  |  |
| 18 | 20.7834 | 2.8765 | 1.80518 | 25.42 |
| 19 | −9.1426 | 7.1626 |  |  |
| 20 | 8.4063 | 3.9094 | 1.71299 | 53.87 |
| 21 | −7.2536 | 0.5958 | 1.84666 | 23.78 |
| 22 | −21.6581 | 0.1186 |  |  |
| 23 | 5.5623 | 1.7736 | 1.80518 | 25.42 |
| 24 | 2.8802 | 1.8497 |  |  |
| 25(St) | ∞ | 2.1981 |  |  |
| 26 | −2.5954 | 0.6010 | 1.59551 | 39.24 |
| 27 | 13.3039 | 2.4164 | 1.49700 | 81.61 |
| 28 | −4.7773 | 0.1515 |  |  |
| 29 | −37.4835 | 2.3560 | 1.49700 | 81.61 |
| 30 | −6.1106 | 0.1186 |  |  |
| 31 | 25.6485 | 1.8049 | 1.65844 | 50.88 |
| 32 | −19.0039 | 2.3854 |  |  |
| 33 | ∞ | 11.0166 | 1.63854 | 55.38 |
| 34 | ∞ | 3.2800 |  |  |
| 35 | ∞ | 0.6550 | 1.51633 | 64.14 |
| 36 | ∞ |  |  |  |

TABLE 11

| Example 4 | |
|---|---|
| |f| | 1.00 |
| Bf | 12.82 |
| FNo. | 2.40 |
| 2ω[°] | 145.7 |

TABLE 12

| | Example 4 | | |
|---|---|---|---|
| Surface Number | 1 | 2 | 3 |
| KA | 2.592195428275E−01 | 6.591135878757E+01 | 2.093120656079E+00 |
| A3 | 3.954111196549E−03 | −7.834139720730E−02 | −6.679871842875E−05 |
| A4 | −1.104760798732E−03 | 1.418443989809E−01 | 4.215209721566E−02 |
| A5 | −5.906716535808E−05 | −7.330836121137E−02 | −1.696239038232E−02 |
| A6 | 4.523853620089E−05 | 4.358820945654E−03 | −5.709095702911E−03 |
| A7 | −1.446524041510E−06 | 1.137233023413E−02 | 4.715706855226E−03 |
| A8 | −8.022042059205E−07 | −3.825873880664E−03 | −3.472439694971E−04 |
| A9 | 5.935954723455E−08 | −6.134846136569E−04 | −4.037179044984E−04 |

TABLE 12-continued

| | Example 4 | | |
|---|---|---|---|
| A10 | 7.357336786216E−09 | 5.463081313490E−04 | 7.593518591382E−05 |
| A11 | −8.361896347412E−10 | −3.715767069055E−05 | 2.155092877919E−05 |
| A12 | −3.286947041775E−11 | −3.526431239469E−05 | −6.237350171478E−06 |
| A13 | 6.245187793416E−12 | 6.621812784103E−06 | −6.516139330919E−07 |
| A14 | 2.274507336361E−14 | 1.022823252410E−06 | 2.782433373363E−07 |
| A15 | −2.634860406576E−14 | −3.540332936903E−07 | 1.115767346556E−08 |
| A16 | 4.166540347063E−16 | −3.320039086225E−09 | −7.415517240424E−09 |
| A17 | 5.935737320698E−17 | 8.642929837558E−09 | −7.807451652548E−11 |
| A18 | −1.658515558774E−18 | −4.639186187888E−10 | 1.076607206250E−10 |
| A19 | −5.559912798904E−20 | −8.172315615454E−11 | 6.125316073998E−14 |
| A20 | 2.010560883813E−21 | 7.295616964994E−12 | −6.644683083853E−13 |

| Surface Number | 12 | 13 |
|---|---|---|
| KA | 1.000000000000E+00 | 1.000000000000E+00 |
| A3 | 5.011176439366E−03 | −2.990121990373E−03 |
| A4 | 6.213759850542E−03 | 1.726187951844E−02 |
| A5 | 1.680762023462E−03 | 7.128562275390E−04 |
| A6 | −3.895361432686E−03 | −3.565089264206E−03 |
| A7 | 6.419782376500E−04 | 1.751987881350E−04 |
| A8 | 8.078785486065E−04 | 6.822050195816E−04 |
| A9 | −2.778624259855E−04 | −6.702878185372E−05 |
| A10 | −7.995960268603E−05 | −1.046015286267E−04 |
| A11 | 4.382626029730E−05 | 1.860172210602E−05 |
| A12 | 2.722459148703E−06 | 8.696311911985E−06 |
| A13 | −3.523222026288E−06 | −2.221078046474E−06 |
| A14 | 1.171710925451E−07 | −3.475866834157E−07 |
| A15 | 1.555660168374E−07 | 1.307643467434E−07 |
| A16 | −1.328962113959E−08 | 3.655832904917E−09 |
| A17 | −3.590070265306E−09 | −3.794385496976E−09 |
| A18 | 4.242378584183E−10 | 1.481097791155E−10 |
| A19 | 3.387940724366E−11 | 4.351524808198E−11 |
| A20 | −4.766172417557E−12 | −3.442120342905E−12 |

Table 13 shows values corresponding to Conditional Expressions (1) to (6) of the projection optical systems of Examples 1 to 4. In Examples 1 to 4, the d line is set as the reference wavelength, and the values shown in Table 13 are based on the d line.

TABLE 13

| Expression Number | | Example 1 | Example 2 | Example 3 | Example 4 |
|---|---|---|---|---|---|
| (1) | Mr/fL1 | 2.84 | 3.72 | 1.98 | 0.94 |
| (2) | \|fR/f\| | 1.82 | 1.72 | 2.09 | 2.45 |
| (3) | f1/f2 | 0.18 | 0.16 | 0.09 | 0.08 |
| (4) | fA/\|f\| | −2.86 | −2.71 | −3.47 | −5.41 |
| (5) | vd2 | 25.43 | 27.51 | 25.43 | 20.36 |
| (6) | DG12/Dm | 0.84 | 0.89 | 0.85 | 0.95 |

As can be seen from the above data, in each projection optical system of Examples 1 to 4, the increase in size of the convex mirror M is suppressed, the wide angle is achieved such that the total angle of view is equal to or greater than 138°, and the F number is 2.4. Thereby, various aberrations are satisfactorily corrected, and high optical performance is achieved.

Figure 9:
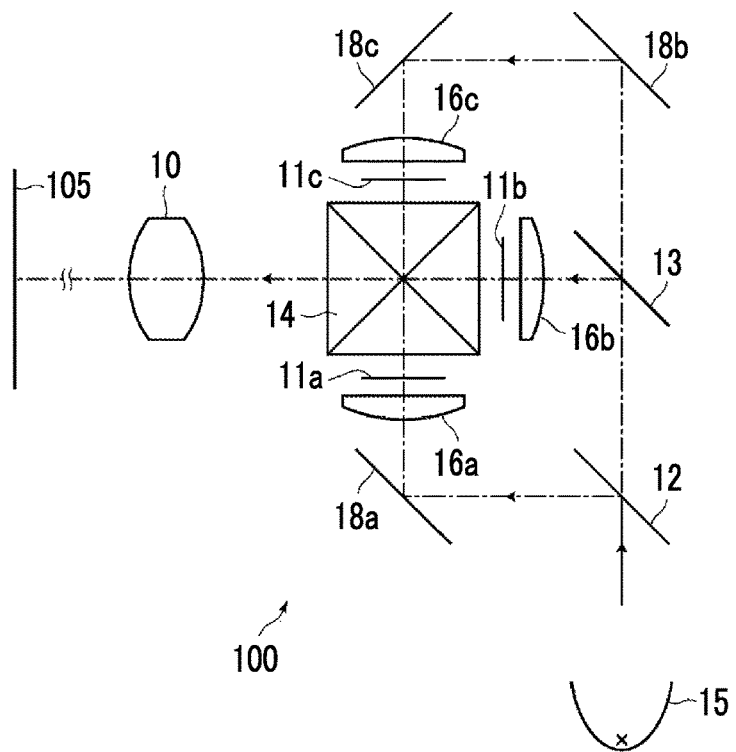
FIG. 9 is a schematic configuration diagram of a projection display device according to an embodiment of the present invention.

Next, a projection display device according to an embodiment of the present invention will be described. FIG. 9 is a schematic configuration diagram of the projection display device according to the above-mentioned embodiment of the present invention. The projection display device 100 shown in FIG. 9 has a projection optical system 10 according to the embodiment of the present invention, a light source 15, transmissive display elements 11a to 11c as light valves corresponding to respective color light rays, dichroic mirrors 12 and 13 for color separation, a cross dichroic prism 14 for color synthesis, condenser lenses 16a to 16c, and total reflection mirrors 18a to 18c for deflecting the optical path. In FIG. 9, the projection optical system 10 is schematically illustrated. Further, an integrator is disposed between the light source 15 and the dichroic mirror 12, but illustration thereof is omitted in FIG. 9.

White light originated from the light source 15 is separated into rays with three colors (green light, blue light, red light) through the dichroic mirrors 12 and 13. Thereafter, the rays respectively pass through the condenser lenses 16a to 16c, are incident into and modulated through the transmissive display elements 11a to 11c respectively corresponding to the rays with the respective colors, are subjected to color synthesis through the cross dichroic prism 14, and are subsequently incident into the projection optical system 10. The projection optical system 10 projects an optical image, which is formed by the modulated light modulated through the transmissive display elements 11a to 11c, onto a screen 105.

Figure 10:
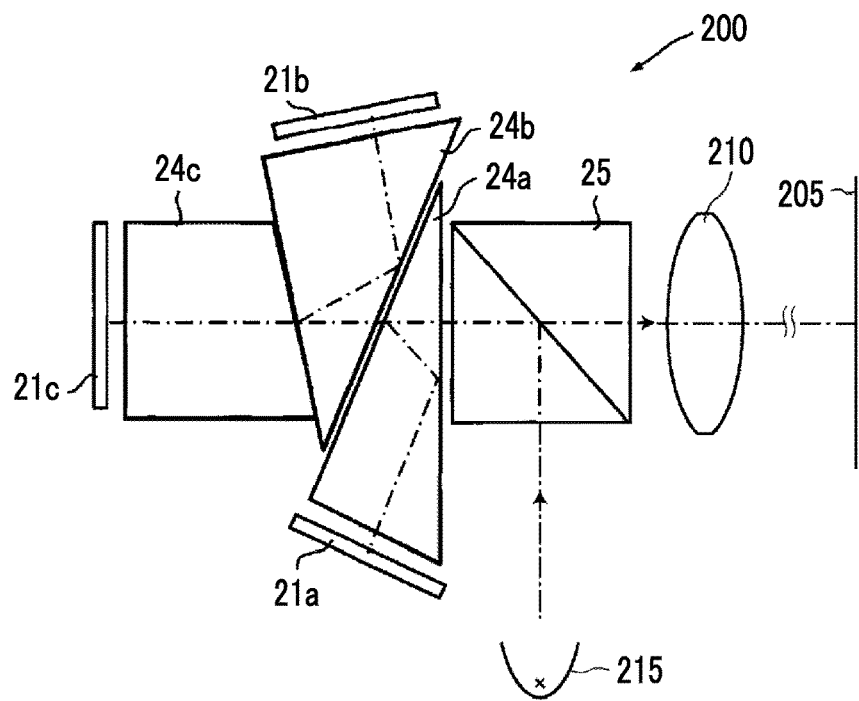
FIG. 10 is a schematic configuration diagram of a projection display device according to another embodiment of the present invention.

FIG. 10 is a schematic configuration diagram of a projection display device according to another embodiment of the present invention. The projection display device 200 shown in FIG. 10 has a projection optical system 210 according to the embodiment of the present invention, a light source 215, DMD elements 21a to 21c as light valves corresponding to respective color light beams, total internal reflection (TIR) prisms 24a to 24c for color separation and color synthesis, and a polarization separating prism 25 that separates illumination light and projection light. In FIG. 10, the projection optical system 210 is schematically illustrated. Further, an integrator is disposed between the light source 215 and the polarization separating prism 25, but illustration thereof is omitted in FIG. 10.

White light originated from the light source 215 is reflected on a reflective surface inside the polarization separating prism 25, and is separated into rays with three colors (green light, blue light, red light) through the TIR prisms 24a to 24c. The separated rays with the respective colors are respectively incident into and modulated through the corresponding DMD elements 21a to 21c, travel through the TIR prisms 24a to 24c again in a reverse direction, are subjected to color synthesis, are subsequently transmitted through the polarization separating prism 25, and are incident into the projection optical system 210. The projection optical system 210 projects an optical image, which is formed by the modulated light modulated through the DMD elements 21a to 21c, onto a screen 205.

Figure 11:
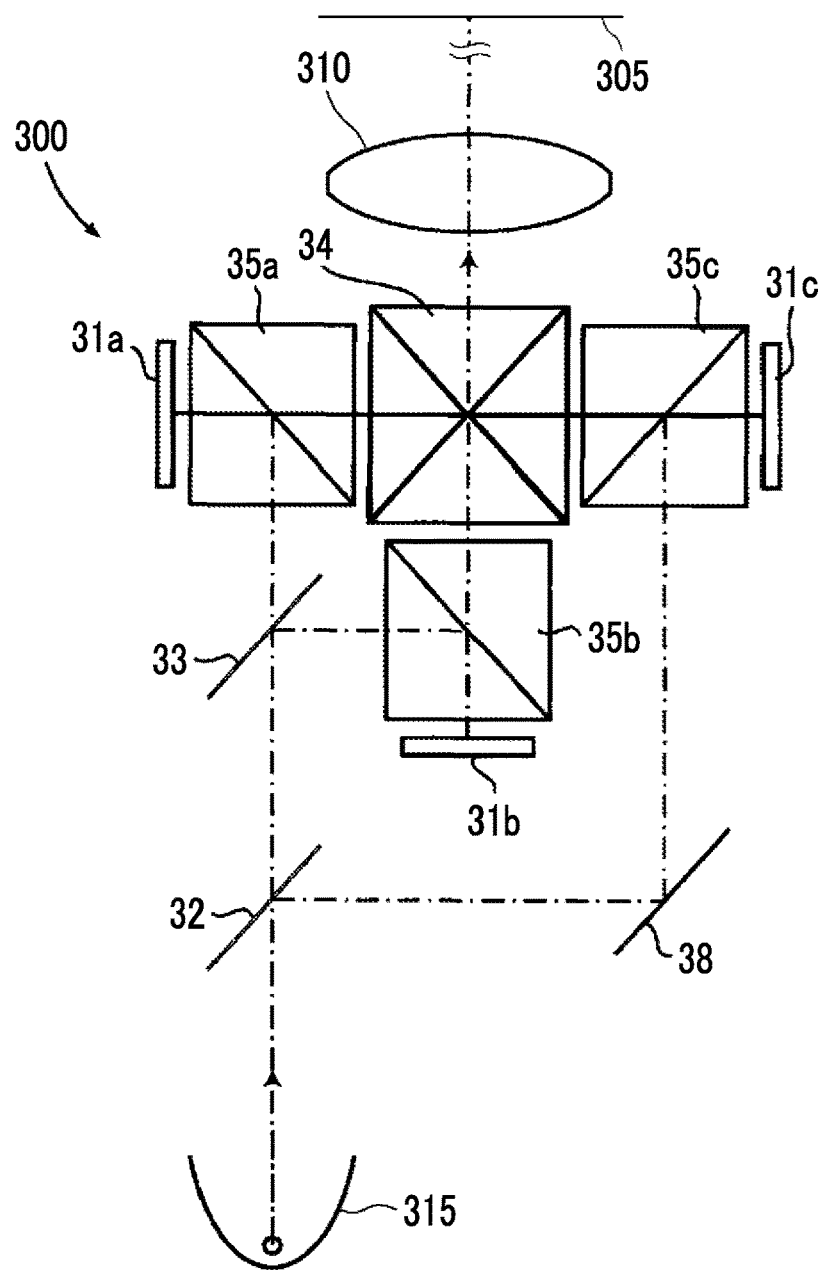
FIG. 11 is a schematic configuration diagram of a projection display device according to still another embodiment of the present invention.

FIG. 11 is a schematic configuration diagram of a projection display device according to still another embodiment of the present invention. The projection display device 300 shown in FIG. 11 has a projection optical system 310 according to the embodiment of the present invention, a light source 315, reflective display elements 31a to 31c as light valves corresponding to respective color light beams, dichroic mirrors 32 and 33 for color separation, a cross dichroic prism 34 for color synthesis, a total reflection mirror 38 for deflecting the optical path, and polarization separating prisms 35a to 35c. In FIG. 11, the projection optical system 310 is schematically illustrated. Further, an integrator is disposed between the light source 315 and the dichroic mirror 32, but illustration thereof is omitted in FIG. 11.

White light originated from the light source 315 is separated into rays with three colors (green light, blue light, red light) through the dichroic mirrors 32 and 33. The separated rays with the respective colors respectively pass through the polarization separating prisms 35a to 35c, are incident into and modulated through the reflective display elements 31a to 31c respectively corresponding to the rays with the respective colors, are subjected to color synthesis through the cross dichroic prism 34, and are subsequently incident into the projection optical system 310. The projection optical system 310 projects an optical image, which is formed by the modulated light modulated through the reflective display elements 31a to 31c, onto a screen 305.

The present invention has been hitherto described through embodiments and examples, but the present invention is not limited to the above-mentioned embodiments and examples, and may be modified into various forms. For example, values such as the radius of curvature, the surface distance, the refractive index, the Abbe number, and the aspheric surface coefficient of each lens are not limited to the values shown in the numerical examples, and different values may be used therefor.

The projection display device of the present invention is also not limited to the above-mentioned configuration, and various modifications of the optical member and the light valve used for the ray separation or the ray synthesis, for example, can be made.

What is claimed is:

1. A projection optical system consisting of, in order from a magnification side to a reduction side:
a first optical system that consists of one convex mirror and a plurality of lenses disposed on the reduction side of the convex mirror; and
a second optical system that includes a plurality of lenses, wherein the second optical system forms an intermediate image at a position conjugate to a reduction side imaging surface, and the first optical system forms a final image, which is conjugate to the intermediate image, on a magnification side imaging surface, wherein a lens closest to the magnification side in the first optical system is a negative lens,
wherein assuming that a paraxial radius of curvature of the convex mirror is Mr and a focal length of the negative lens closest to the magnification side in the first optical system is fL1, Conditional Expression (1) is satisfied, $$0<Mr/fL1<4.5 \qquad (1), \text{ and}$$

wherein assuming that a composite focal length of all lenses positioned to be closer to the reduction side than the convex mirror is fR and a focal length of the projection optical system is f, Conditional Expression (2) is satisfied, $$1.5<|fR/f|<3.5 \qquad (2).$$

2. The projection optical system according to claim 1, wherein a second lens from the magnification side in the first optical system is a negative lens.

3. The projection optical system according to claim 1, wherein assuming that a focal length of an air lens formed of a reduction side lens surface of the lens closest to the magnification side in the first optical system and a magnification side lens surface of the second lens from the magnification side in the first optical system is fA and a focal length of the projection optical system is f, Conditional Expression (4) is satisfied, $$-8<fA/|f|<-2 \qquad (4).$$

4. The projection optical system according to claim 3, wherein Conditional Expression (4-1) is satisfied, $$-7<fA/|f|<-2.4 \qquad (4\text{-}1).$$

5. The projection optical system according to claim 1, wherein assuming that the first optical system and the second optical system have a common optical axis, an air gap on the optical axis between the first optical system and the second optical system is DG12, and an air gap on the optical axis between the convex mirror and the lens closest to the magnification side in the first optical system is Dm, Conditional Expression (6) is satisfied, $$0.6<DG12/Dm<1.5 \qquad (6).$$

6. The projection optical system according to claim 5, wherein Conditional Expression (6-1) is satisfied, $$0.7<DG12/Dm<1.2 \qquad (6\text{-}1).$$

7. The projection optical system according to claim 1, wherein Conditional Expression (1-1) is satisfied, $$0.5<Mr/fL1<4 \qquad (1\text{-}1).$$

8. The projection optical system according to claim 1, wherein Conditional Expression (2-1) is satisfied, $$1.6<|fR/f|<2.6 \qquad (2\text{-}1).$$

9. A projection display device comprising:
a light source;
a light valve into which light emitted from the light source is incident; and
the projection optical system according to claim 1,
wherein the projection optical system projects an optical image using modulated light, which is modulated through the light valve, onto a screen.

10. A projection optical system consisting of, in order from a magnification side to a reduction side:
a first optical system that consists of one convex mirror and a plurality of lenses disposed on the reduction side of the convex mirror; and a second optical system that includes a plurality of lenses, wherein the second optical system forms an intermediate image at a position conjugate to a reduction side imaging surface, and the first optical system forms a final image, which is conjugate to the intermediate image, on a magnification side imaging surface, wherein a lens closest to the magnification side in the first optical system is a negative lens, wherein assuming that a paraxial radius of curvature of the convex mirror is Mr and a focal length of the negative lens closest to the magnification side in the first optical system is fL1, Conditional Expression (1) is satisfied, $$0 < Mr/fL1 < 4.5 \qquad (1), \text{ and}$$

wherein assuming that a focal length of the first optical system is f1 and a focal length of the second optical system is f2, Conditional Expression (3) is satisfied, $$0.03 < f1/f2 < 0.25 \qquad (3).$$

11. The projection optical system according to claim 10, wherein Conditional Expression (3-1) is satisfied, $$0.05 < f1/f2 < 0.22 \qquad (3\text{-}1).$$

12. A projection display device comprising:
a light source;
a light valve into which light emitted from the light source is incident; and
the projection optical system according to claim 10,
wherein the projection optical system projects an optical image using modulated light, which is modulated through the light valve, onto a screen.

13. A projection optical system consisting of, in order from a magnification side to a reduction side:
a first optical system that consists of one convex mirror and a plurality of lenses disposed on the reduction side of the convex mirror; and
a second optical system that includes a plurality of lenses, wherein the second optical system forms an intermediate image at a position conjugate to a reduction side imaging surface, and the first optical system forms a final image, which is conjugate to the intermediate image, on a magnification side imaging surface, wherein a lens closest to the magnification side in the first optical system is a negative lens, wherein assuming that a paraxial radius of curvature of the convex mirror is Mr and a focal length of the negative lens closest to the magnification side in the first optical system is fL1, Conditional Expression (1) is satisfied, $$0 < Mr/fL1 < 4.5 \qquad (1), \text{ and}$$

wherein assuming that an Abbe number of the second lens from the magnification side in the first optical system at the d line is vd2, Conditional Expression (5) is satisfied, $$10 < vd2 < 40 \qquad (5).$$

14. The projection optical system according to claim 13, wherein Conditional Expression (5-1) is satisfied, $$15 < vd2 < 35 \qquad (5\text{-}1).$$

15. A projection display device comprising:
a light source;
a light valve into which light emitted from the light source is incident; and
the projection optical system according to claim 13,
wherein the projection optical system projects an optical image using modulated light, which is modulated through the light valve, onto a screen.

* * * * *